United States Patent
Jayaram

(10) Patent No.: US 8,893,269 B1
(45) Date of Patent: Nov. 18, 2014

(54) IMPORT AUTHORITIES FOR BACKUP SYSTEM

(71) Applicant: EMC Corporation, Hopkinton, MA (US)

(72) Inventor: Harish Jayaram, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/631,678

(22) Filed: Sep. 28, 2012

(51) Int. Cl.
*G06F 17/30* (2006.01)
*G06F 13/00* (2006.01)

(52) U.S. Cl.
USPC .............. 726/21; 711/114; 726/1; 707/610; 707/620; 707/640; 707/641; 707/644; 707/763

(58) Field of Classification Search
CPC ............ H04L 67/1097; H04L 41/0803; G06F 11/2058; Y10S 707/99955
See application file for complete search history.

(56) References Cited

U.S. PATENT DOCUMENTS

| | | | |
|---|---|---|---|
| 6,073,242 A * | 6/2000 | Hardy et al. | 726/1 |
| 7,430,600 B2 * | 9/2008 | Trabelsi et al. | 709/225 |
| 7,801,908 B2 * | 9/2010 | Zachariah | 707/763 |
| 8,051,168 B1 * | 11/2011 | Boysko et al. | 709/225 |
| 2004/0003086 A1 * | 1/2004 | Parham et al. | 709/226 |
| 2004/0064691 A1 * | 4/2004 | Lu et al. | 713/158 |
| 2005/0033804 A1 * | 2/2005 | Iwami et al. | 709/203 |
| 2006/0195670 A1 * | 8/2006 | Iwamura et al. | 711/162 |
| 2007/0162748 A1 * | 7/2007 | Okayama et al. | 713/165 |
| 2008/0275962 A1 * | 11/2008 | Kobayashi et al. | 709/218 |
| 2009/0083443 A1 * | 3/2009 | Ocko et al. | 709/248 |
| 2009/0132710 A1 * | 5/2009 | Pelley | 709/226 |
| 2009/0150981 A1 * | 6/2009 | Amies et al. | 726/5 |
| 2009/0165082 A1 * | 6/2009 | Adebiyi et al. | 726/1 |
| 2010/0211548 A1 * | 8/2010 | Ott et al. | 707/655 |
| 2011/0125393 A1 * | 5/2011 | Williams et al. | 701/200 |
| 2012/0072664 A1 * | 3/2012 | Higaki et al. | 711/114 |
| 2012/0131646 A1 * | 5/2012 | Chandolu et al. | 726/4 |
| 2012/0324592 A1 * | 12/2012 | Korablev et al. | 726/30 |
| 2013/0061306 A1 * | 3/2013 | Sinn | 726/7 |

* cited by examiner

*Primary Examiner* — Dede Zecher
*Assistant Examiner* — Trang Doan
(74) *Attorney, Agent, or Firm* — Staniford Tomita LLP

(57) ABSTRACT

This disclosure relates to a method, article of manufacture, and apparatus of importing authorities for backup systems. In some embodiments, this includes having a directory service engine retrieve authorities from an external directory service, obtain users and groups from the authorities, map the users and the groups to roles of internal authorities, and distribute the mapping to the internal authorities. The directory service engine may also export authorities to the external directory service and may be used for communication with the external directory service for authentication and access control.

11 Claims, 7 Drawing Sheets

IMPORT AUTHORITIES FOR BACKUP SYSTEM

FIELD

The present invention relates generally to storage systems and specifically to systems and methods of importing authorities for backup software of storage systems.

BACKGROUND

Lightweight Directory Access Protocol (LDAP) is often used to provide authentication and access control in an enterprise. Authentication may include a method for identifying a user to the system. Access control may involve what the user is allowed to see and do once the user has been identified. As part of the access control, a LDAP directory service may be configured to administer organizational information such as user assignment to groups during authentication.

In addition to LDAP directory service, multiple systems and products in an enterprise environment may provide authentication and contain customization of access control schemes. Similar to LDAP directory service, these systems and products may have repositories to store properties, roles and rights of users for authentication and access control. One challenge in such heterogeneous environments is the ability to seamlessly and efficiently integrate other systems and products in the enterprise with LDAP directory service.

For example, administrators may have implemented directory server within an organization prior to and/or post a LDAP implementation. To leverage the external LDAP server and repository, authorities for authentication and access control may need to be imported and/or exported. The mapping between the existing directory server data and the LDAP repository may be problematic and inefficient when performed manually. Going through multiple steps of wizard configuration to manually align users and groups is both laborious and error prone.

There is a need, therefore, for an improved method or system that would efficiently and effectively import and/or export authorities for backup software of storage system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
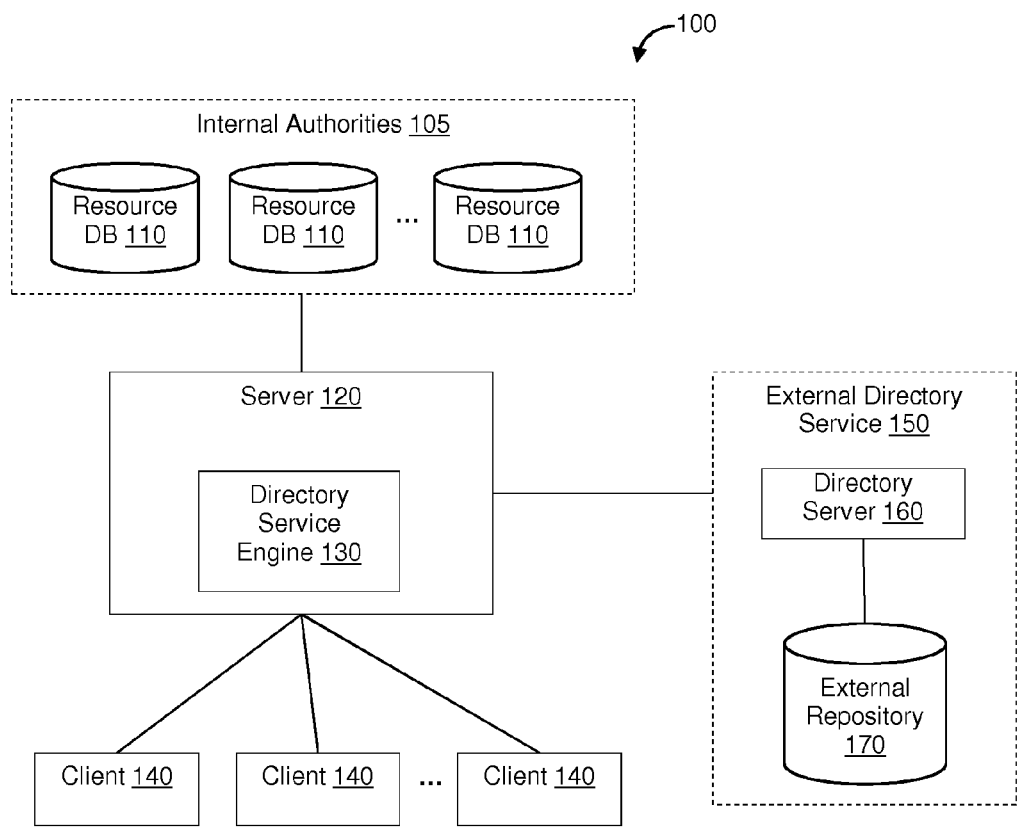
FIG. 1 is a diagram of a storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems that would import authorities for backup software of storage systems. In an enterprise, authentication and access control are necessary for backup software to perform appropriate backup functions of storage systems. Authority information such as users and groups for authentication and access control purpose may be configured and stored in multiple places. For example, LDAP directory service is often used for authentication and access control. When authentication and access control have already been configured in backup software, methods and systems in existence today often do not provide the ability to migrate the already configured users and groups to LDAP repository. Conversely, when users and groups have been configured by LDAP directory service, methods and systems in existence today often do not provide the ability to make available such external authority information to backup software. Backup products administrators may need to manually import and/or export a list of users and groups before further configuration and distribution.

Further, overtime, the maintenance overhead of keeping multiple authorities in sync may be burdensome for administrators. For example, users entered through LDAP directory service may not be configured with appropriate privilege to perform certain backup operations. Similarly, a user configured internally to perform backup operations may not be authenticated with an external LDAP directory server. In both cases, some users may not be authenticated and gain access to perform appropriate backup tasks. Troubleshooting could take up an enormous amount of administration time.

Accordingly, it may be desirable to have an efficient and effective method and system to integrate multiple authentication and access control schemes and migrate authentication and access control data between external authorities, such as users and groups stored in LDAP repository, and internal authorities of the backup application. The efficient and effective method and system would also be able to validate users using external authorities for authentication and access control.

FIG. 1 is a system architecture illustrating one embodiment of a data storage system. Storage System 100 includes Server 120, Clients 140, Internal Authorities 105, and External Directory Service 150. Internal Authorities 105 may include a plurality of Resource Databases 110 for storing information such as server configuration, authentication and access control information. External Directory Service 150 may include Directory Server 160, such as a LDAP server, and External Repository 170, such as a LDAP repository. Authority information such as users and groups may be configured through Directory Server 160 and stored in External Repository 170. Using the information stored in External Repository 170, authentication and access control to Storage System 100 may be implemented.

Server 120 may further include Directory Service Engine 130. Through Directory Service Engine 130, authority information already configured and stored in Resource Databases 110 may be exported to External Directory Service 150. Conversely, through Directory Service Engine 130, external authority information already configured by Directory Server 160 and stored in External Repository 170 may be imported and distributed to appropriate Resource Databases 110 of Internal Authorities 105. Directory Service Engine 130 may also be used for communicating with External Directory Service 150 when authorities stored in External Repository 170 are used for authentication and access control.

Each of Clients 140 may be a backup client, such as a laptop, desktop, or a virtual machine. As illustrated by FIG. 1, there may be any number of Clients 140. Server 120 may store backup data on storage device and transfer backup data to Clients 140 when necessary. In some embodiments, Clients 140 may be in communication with Server 120 using a dedicated communication link, one or more networks, a local area network, a wide area network, a storage area network, the Internet, a wired network, and/or wireless network, among others. Similarly, other communication links connecting Clients 140, Server 120, and Directory Server 150 may be a dedicated communication link, one or more networks, a local area network, a wide area network, a storage area network, the Internet, a wired network, and/or wireless network, among others. Though FIG. 1 illustrates only one External Directory Service 150, Server 120 may be connected to multiple External Directory Services 150 within one or more networks.

Still referring to FIG. 1, in some embodiments, Server 120 may be associated with Internal Authorities 105 containing Resource Databases 110 in order to store information of configuration at a given time instance within Storage System 100. Such information may be related to devices, schedules, clients, users, groups and policies, among others. Though FIG. 1 illustrates Resource Databases 110 to be internal to Storage System 100, Resource Database 110 may reside and operate or to be operated outside Storage System 100. Similarly, though FIG. 1 illustrates Directory Service Engine 130 as internal to Server 120, Directory Service Engine 130 may be internal or external to Server 120. In some embodiments, Directory Service Engine 130 may be modules that are installed on various components of Server 120 and capable of executing the processes and methods described herein. As used herein, "module" may refer to logic embodied in hardware or firmware, or to a collection of instructions such as software instructions, possibly having entry and exit points, written in instructions or a programming language. The modules described herein may also be represented in hardware or firmware.

Figure 2:
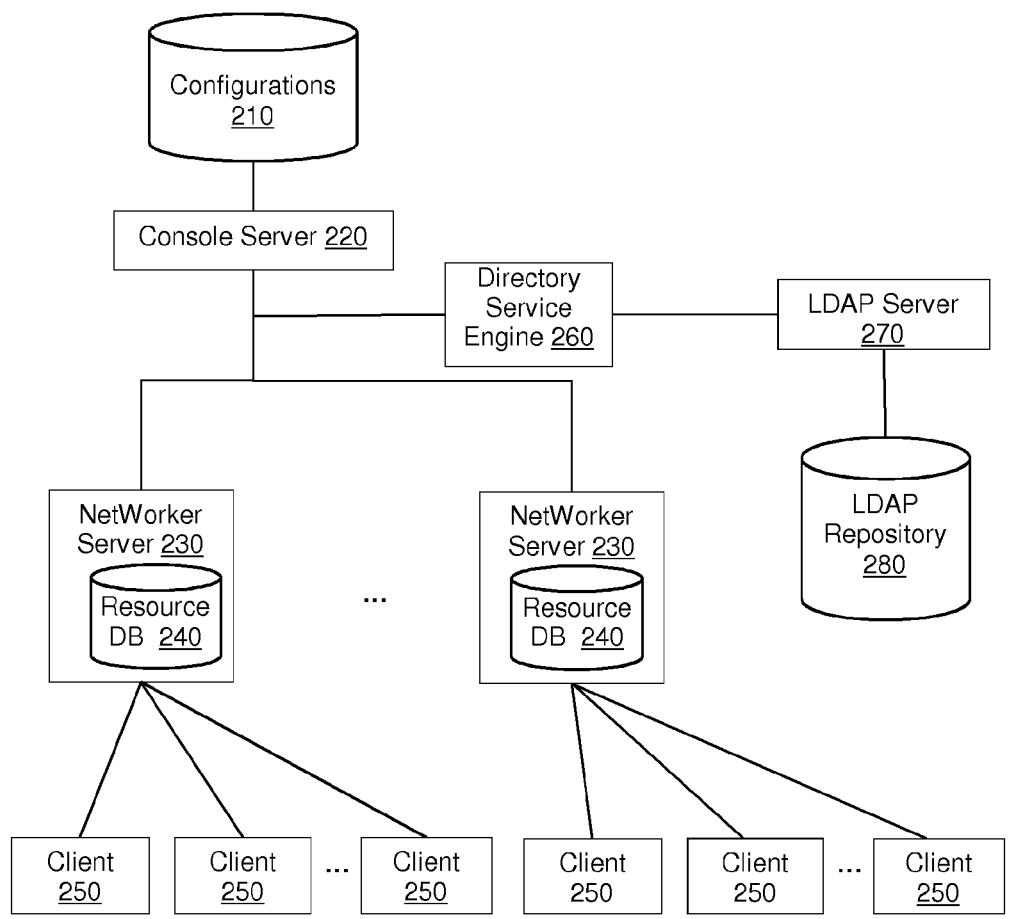
FIG. 2 is a diagram of a Networker storage system in accordance with some embodiments.

Though FIG. 1 illustrates one Server 120, Storage System 100 may include multiple Servers 120. Each of the servers may be associated with one or more Resource Databases 110 for storing configuration and authority information including authentication and access control data. An example of a storage system, which utilizes Resource Databases 110 to facilitate system configuration as well as authentication and access control, is Networker, a product available from EMC Corporation. FIG. 2 is an exemplary system diagram of a Networker storage system using external authorities configured through a LDAP Server (e.g. Microsoft Active Directory Server, Sun One Directory Sever, OpenLDAP Server etc.) and stored in corresponding LDAP repositories for authentication and access control, in accordance with some embodiments.

In the exemplary system of FIG. 2, multiple Networker Servers 230 may be connected to Console Server 220. Console Server 220 may be responsible for managing Networker Servers 230 and Clients 250. The tasks performed by Console Server 220 may include managing internal authority information for Networker Servers 230 and Clients 250. Console Server 220 may be associated with one or more resource databases to store Configurations 210. Such configurations may include system and application settings as well as internal authority information, among others. Similar to Console Server 220, each Networker Server 230 may also be associated with Resource Database 240 for storing configuration as well as internal authority information. Both Console Server 220 and Networker Server 230 may communicate with external directory server, such as LDAP Server 270 through Directory Service Engine 260 and use the external authority information stored LDAP Repository 280 for authentication and access control.

Figure 3A:
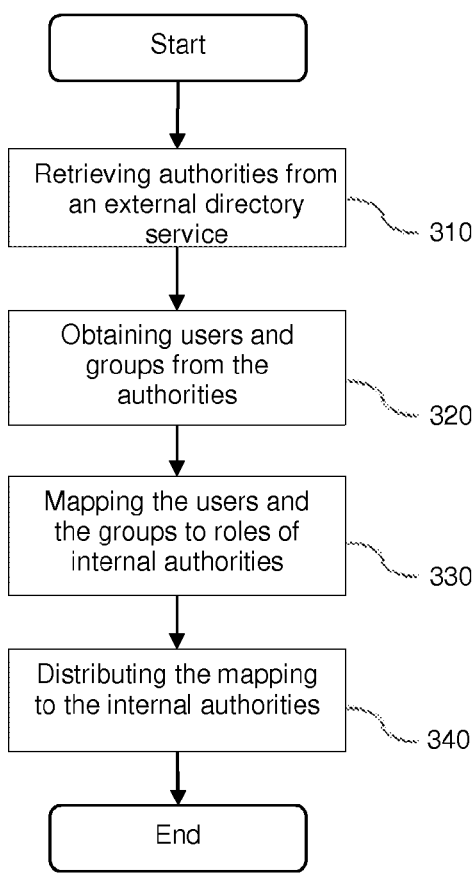
FIG. 3A is a flowchart illustrating import authorities in accordance with some embodiments.
Figure 3B:
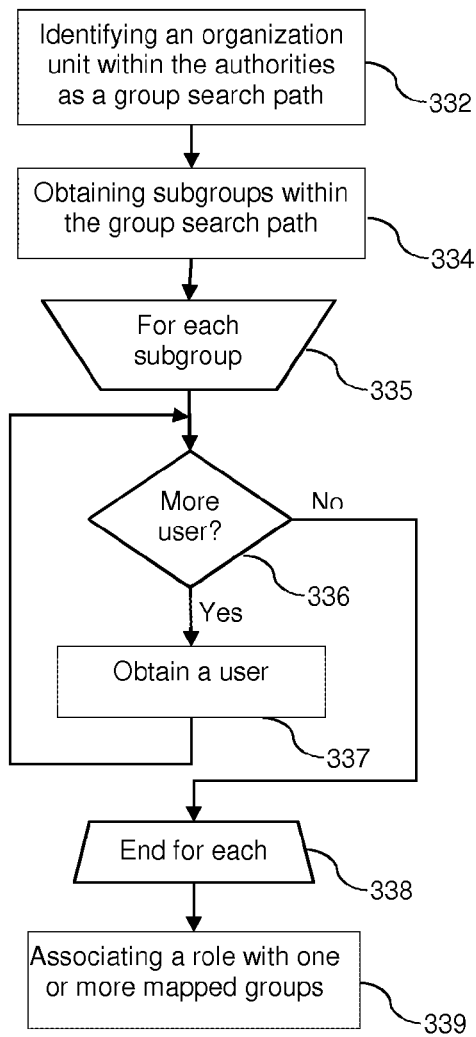
FIG. 3B is a flowchart illustrating mapping authorities in accordance with some embodiments.

Though FIG. 2 illustrates Directory Service Engine 260 as external to Console Server 220 and Networker Servers 230, Directory Service Engine 260 may be modules internal or external to Console Server 220 and Networker Servers 230. Through Directory Service Engine 260, servers such as Console Server 220 and/or Networker Servers 230 may communicate with LDAP Server 270 to import and/or export authority information, such as users and groups. Once users and groups are imported from LDAP Repository 280, Directory Service Engine 260 may also synchronize the authority information among different resource databases associated with Console Server 220 and Networker Servers 230, such as Resources Databases 240 and 210 respectively. Further, when a user logs in the system, Console Server 220 and Networker Servers 230 may communicate through Directory Service Engine 260 to validate the user privilege for access control based on external authority information stored in LDAP Repository 280. FIG. 3A and FIG. 3B illustrate the logical interaction between Console Server 220 and LDAP Server 270 through Directory Service Engine 260, as well as the interaction between Networker Servers 230 and LDAP Server 270 through Directory Service Engine 260 in further detail.

FIG. 3A is a flowchart illustrating an exemplary import authorities function performed by Directory Service Engine 260 in accordance with some embodiments. In step 310, an attempt to retrieve authorities from an external directory service, such as LDAP directory service, may be made by Directory Service Engine 260. Upon retrieving authorities from the external directory service, in step 320, Directory Service Engine 260 may decode the authorities in order to obtain users and groups. The users and groups may then be mapped to roles of internal authorities in step 330 before Directory Service Engine 260 distributes the mapped users and groups to the internal repositories, in step 340.

For example, Directory Service Engine 260 may read external authority information as data stream from stdin or a socket connection and decode the data stream. The decoding may involve separation of users and groups. The decoded data may then be distributed to resource databases associated with NetWorker server and console server. FIG. 3B illustrates the mapping step of 330 in further detail in accordance with some embodiments.

FIG. 3B is a flowchart illustrating authorities mapping of step 330, in accordance with some embodiments. In some embodiments, LDAP directory service may be used as external directory service. LDAP directory service may include a LDAP server along with a LDAP repository. When using LDAP directory service, authority information, such as users and groups, may be organized hierarchically. Users may be organized as members of groups. Within each groups, more groups containing more member users may be formed. In step 332, an organization unit within the authorities may be identified as the beginning of a group search path. In step 334, subgroups within the group search path may be obtained. From step 335 to 338, for each subgroup obtained, one or more users belong to the subgroup may be obtained. Having processed all the subgroups, associations of internal roles and external groups may be recorded and stored. The associations may record the mapping between some of the subgroups and the internal roles. Member users information associated with the mapped subgroups may be obtained from the external directory service, and recorded and stored along with the associations.

Figure 4:
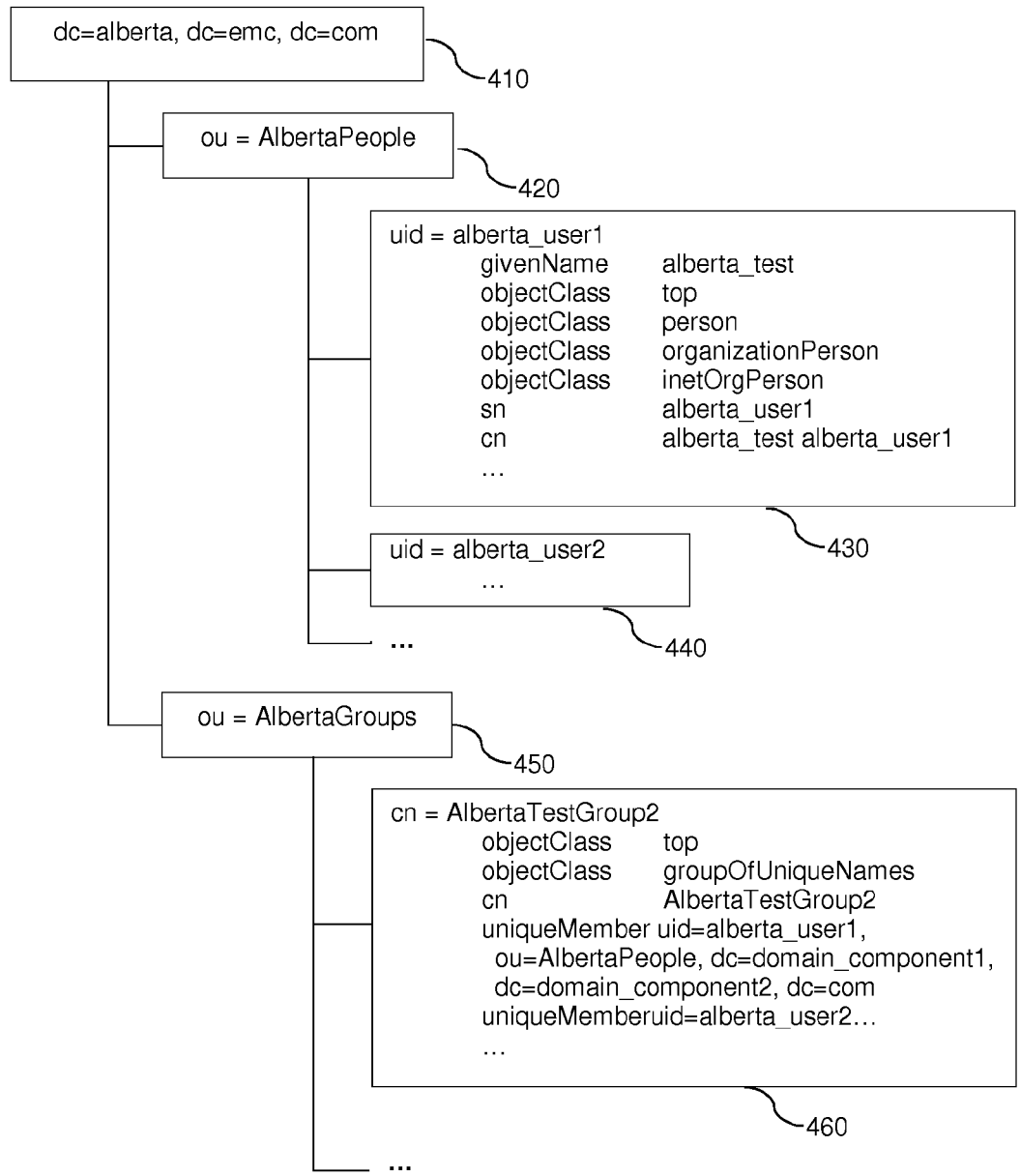
FIG. 4 is a diagram of an exemplary LDAP repository for importing authorities in accordance with some embodiments.

FIG. 4 is an exemplary LDAP repository for storing authority information, in accordance with some embodiments. In the exemplary LDAP repository, members of organizations may be organized in a hierarchical structure. The top of the hierarchical structure 410 may be domain components (dc). Domain components may be a host address associated with a LDAP server. Under the top 410, organizational units (ou) may be organized to store users and/or groups. For example, in the exemplary LDAP repository of FIG. 4, users may be organized under organizational unit AlbertaPeople 420, and users login information for authentication may be stored for each entry such as 430 and 440. Similarly, groups may be organized under organizational unit AlbertaGroups 450, and groups information for access control may be stored for each entry such as 460.

As illustrated in FIG. 4, a user entry 430 with user identifier (uid) of alberta_user1 and objectClass attribute value of inetOrgPerson may be stored within organizational unit AlbertaPeople 420. Similarly, another user entry 440 with uid of alberta_user2 and objectClass attribute value of inetOrgPerson may be stored within organizational unit AlbertaPeople. Within organizational unit AlbertaGroups 450, one or more groups may be stored. Each group may be identified by common name (cn) such as AlbertaTestGroup2 460, and the objectClass attribute value of the group may be groupOfUniqueNames or groupOfNames. Member users of each group may be listed under the group. As illustrated in FIG. 4, alberta_user1 and alberta_user2 may be member users listed under AlbertaTestGroup2, and the login information associated with users alberta_user1 and alberta_user2, such as organizational unit AlbertaPeople and domain components, may also be listed under AlbertaTestGroup2.

Figure 5A:
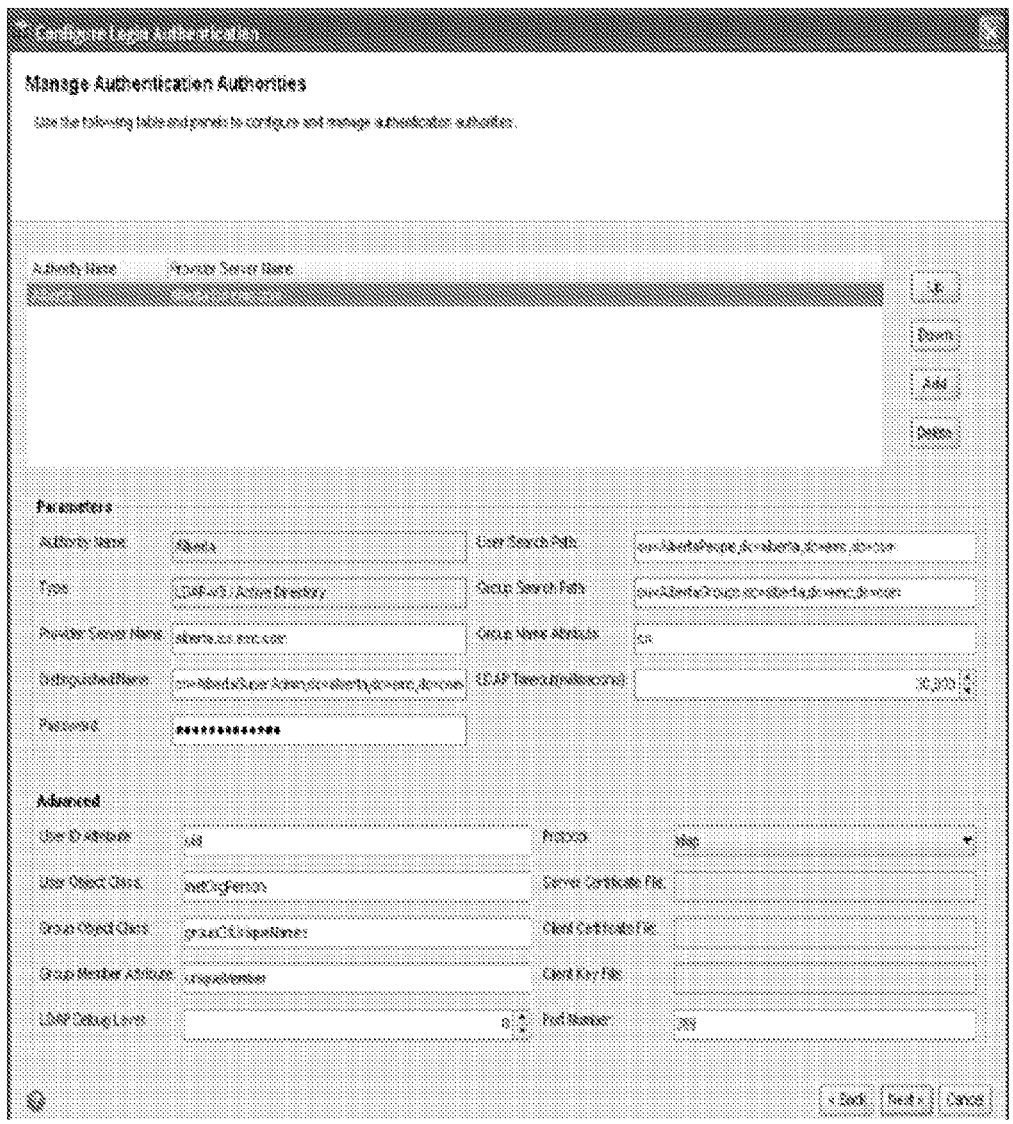
FIG. 5A is a pictorial diagram of an exemplary interface for importing authorities in accordance with some embodiments.

FIG. 5A is a pictorial diagram of an exemplary interface for importing authorities using the exemplary LDAP repository illustrated in FIG. 4, in accordance with some embodiments. Connection information, such as Authority Name and Provider Server Name associated with an external directory server may be entered. Alternatively, Provider Server IP address may be used in place of Provider Server Name. In some embodiments, when a LDAP server is used an as external directory server, Provider Server Name as well as Authority Name may be obtained by listening on port 389, the default port for a LDAP server. By listening on port 389, a list of already configured external authorities within one or more networks may be obtained and provided to users.

Once an external directory server is selected and received by Directory Service Engine, Parameters for the external authority may be entered by users, in some embodiments. User Search Path parameter may correspond to an organizational unit storing users, such as AlbertaPeople illustrated in FIG. 4. Group Search Path parameter may correspond to an organizational unit storing groups, such as AlbertaGroups illustrated in FIG. 4.

Alternatively, instead of entering parameters such as User Search Path and Group Search Path, a separate popup window may be displayed to users for selecting the values of parameters. In some embodiments, when an external directory repository is a LDAP repository, the hierarchical structure in the LDAP repository may be displayed in the separate popup window. After receiving connection information of an external directory server and connecting successfully to the external directory server using the connection information supplied, external authorities such as users and groups may be obtained from the external directory repository through the external directory server. The authorities obtained may then be displayed to users in the popup window as a hierarchical structure. Users may then select an appropriate organizational unit from the hierarchical structure as User Search Path. Similarly, users may select appropriate organizational unit as Group Search Path from the separate popup window display of the hierarchical structure of the LDAP repository.

Distinguished Name as a parameter may be a domain name of a privileged external account that is used to perform operations such as searching for users and groups in the external directory repository. The corresponding password for the privileged account may be entered into Password field. Various Advanced fields may be entered as illustrated in the exemplary user interface of FIG. 5A, in accordance with some embodiments. Upon entering information of the authorities imported, clicking Next button may take users to an exemplary user interface of distributing authorities as illustrated in FIG. 5B.

Figure 5B:
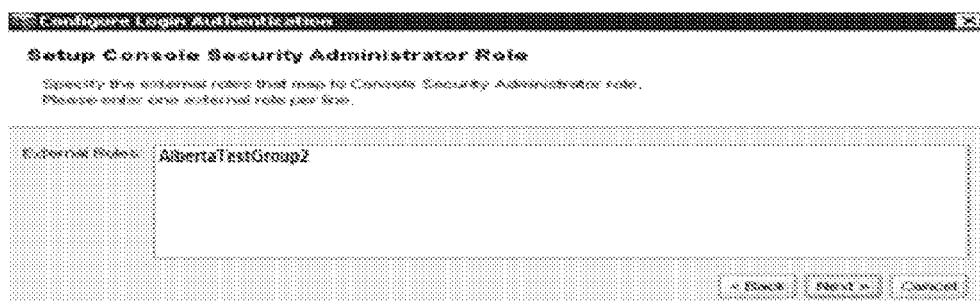
FIG. 5B is a pictorial diagram of an exemplary interface for mapping an administrator role to an external authority group in accordance with some embodiments.

FIG. 5B is a pictorial diagram of an exemplary interface for mapping an administrator role to an external authority group in accordance with some embodiments. Having imported users and groups from an external authority, groups may be further mapped to different roles in the internal authorities of a backup system. The exemplary user interface of FIG. 5B illustrates a mapping of a group, such as AlbertaTestGroup2 to a role in the backup system, such as Console Security Administrator. The groups may be entered by users. Alternatively, a popup window may allow users to select one or more groups to be mapped to Console Security Administrator role. Upon the completion of mapping, users and groups from LDAP repository may be distributed to internal repositories and stored, and available for authentication and access control.

Figure 6:
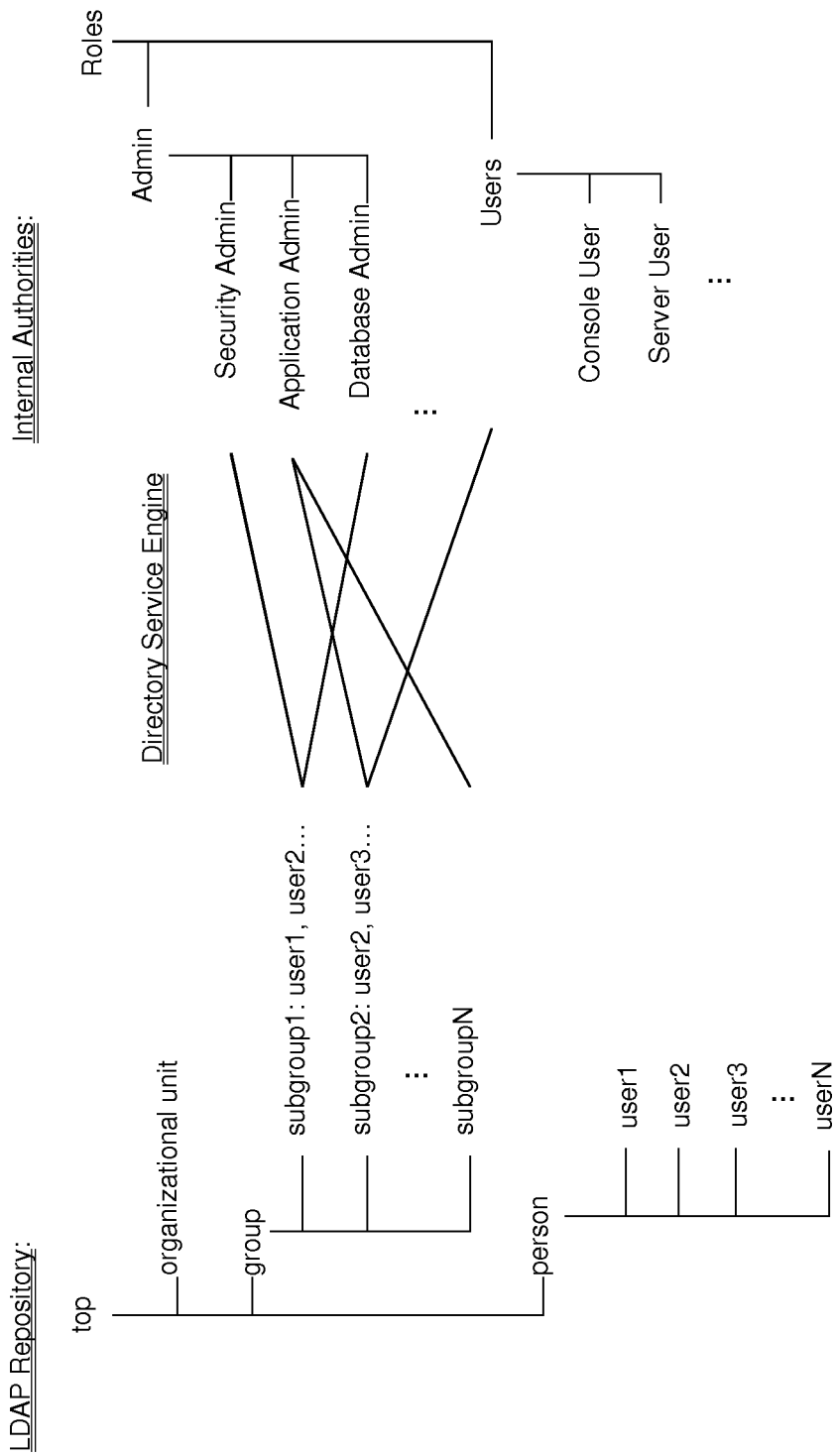
FIG. 6 is a diagram of an exemplary mapping of LDAP repository groups to roles of internal authorities in accordance with some embodiments.

In some embodiments, the authorities distribution illustrated in FIG. 5B may be implemented by providing a common platform to map groups of the external authority to roles within a backup system, as illustrated in FIG. 6. A plurality of roles may have already been defined in the backup system for access control. Users assigned to different roles may have different privileges. For example, users with administrator role may have the privileges such as add, delete, and edit users. In contrast, users with regular user role may not be able to control user access to Server. Such defined roles in the backup system may be mapped to groups within LDAP using a common platform.

As illustrated in FIG. 6, in an external directory repository, such as a LDAP repository, a group organization unit may contain subgroup1, subgroup2 . . . subgroupN. In internal repositories, various roles such as Admin and Users may contain more specific roles for different privileges. During import and/or export authorities, the external subgroups may be mapped to one or more internal roles.

For example, as illustrated in FIG. 6, subgroup1 may be mapped to Security Admin and Database Admin role under Admin role. Once mapped, member users in subgroup1 such as user1, user2 etc. may be assigned to Security Admin and Database Admin role, and may have privileges to perform corresponding admin tasks. Similarly, subgroup2 may be mapped to Application Admin and Users role. Member users in subgroup2, such as user2, user3 etc. may be assigned to Application Admin and Users role, and may have privileges to perform corresponding admin tasks as well as users tasks, such as Console User, Server User etc. In a similar vein, Application Admin role may be mapped to multiple subgroups, such as subgroup2 and subgroupN. Member users in subgroup2 and subgroupN may be assigned to Application Admin privilege to perform corresponding admin tasks.

During import authorities, defined roles of internal authorities and available groups of the external authority may be displayed to users. Users may choose groups of the external authority to map to the roles of the internal authorities. According to the mapping, users and groups retrieved from the external directory repository may then be distributed to corresponding internal repositories. Similarly, during export authorities, users and groups data may be retrieved from internal repositories and sent to the external directory repository. Having the mapping of groups and roles in accordance with some embodiments provides the flexibility and convenience of assigning and updating privileges at one central location.

Having Directory Service Engine performing importing authorities, in accordance with some embodiments, has several benefits. First, during system integration, extra efforts of duplicating authorities may be avoided. Users and groups already configured in an external directory service may be imported and distributed to internal repositories. Once external authorities from the external directory service are imported and distributed, internal authorities may be made available to backup applications and used for authentication and access control. In addition, in some embodiments, the external authorities may be retrieved from external directory servers and be selected for mapping during the import. The automated retrieval avoids the needs to validate users and groups. Thus, importing authorities performed by Directory Service Engine may improve both the efficiency and accuracy during integration.

Second, Directory Service Engine may also be used for exporting authorities. The same common platform for importing authorities may be used for exporting. Authority information, such as roles and users assigned to each role, already configured in a storage system may be retrieved by Directory Service Engine from various internal repositories. The internal authority information may then be sent to the external authority. Along with authority information, instructions may be sent to the external authority for adding data such as users and/or group to the external repository. Once exported, backup applications in a storage system may have the option of using either the internal or the external authority for authentication and access control. And similar to the import, since the validation of users and groups may be carried out during export, the export performed by Directory Service Engine may improve both the efficiency and accuracy during integration.

Third, since Directory Service Engine provides both import and export function, authority information may be maintained in both internal and external repositories. Having authority information in multiple repositories, Storage System 100 may provide users the option of using either external or internal authority information for authentication and access control. If the users choose to use external directory service for authentication and access control, Directory Service Engine may be used to communicate with external directory.

Figure 7:
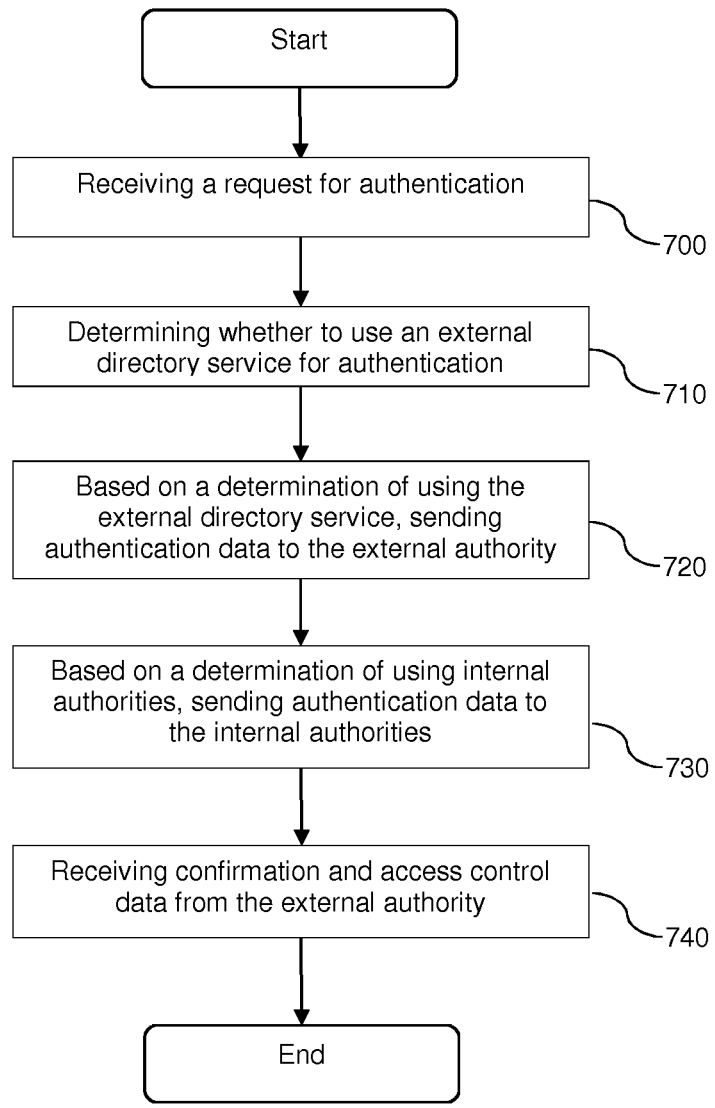
FIG. 7 is a flowchart illustrating using an external authority for authentication and access control in accordance with some embodiments.

FIG. 7 is a flowchart illustrating Directory Service Engine using an external authority for authentication and access control, in accordance with some embodiments. In step 700, a user may enter authentication data, such as user login information and send a request for authentication to Directory Service Engine. In step 710, Directory Service Engine may look up server configurations to determine whether to use external or internal authority information for authentication. The server configuration may be stored in internal repositories, such as a resource database. If the configuration indicates that external authority information is used for authentication, in step 720, the authentication data including the user login information may be sent to an external directory service. Along with the authentication data, authentication instructions may be sent to the external directory service. On the other hand, if the configuration indicates that internal authority information is used for authentication, in step 730, the authentication data may be sent to internal authorities. If the authentication is successful, a confirmation and access control data may be returned from either the external directory service or the internal authorities and received by Directory Service Engine in step 740.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method of providing authorities used in authentication and access control for a backup system comprising:
   receiving a connection information associated with an external directory service, wherein the connection information includes an authority name and a provider server name associated with the external directory service;
   connecting to the external directory service using the connection information;
   upon a successful connection, obtaining external authorities from the external directory service, wherein the external authorities comprises users and groups stored in the external directory service;
   obtaining the users and the groups from the external authorities;
   mapping the users and the groups to internal authorities, wherein the internal authorities include configurations, roles, and member users assigned to each of the roles, the internal authorities stored in a plurality of resource databases provides authentication and access control to the backup system; and
   distributing and storing the mapping to the plurality of resource databases.

2. The method as recited in claim 1, wherein receiving the connection information associated with the external directory service comprises:
   obtaining a list of external directory services within a network by listening to a port;
   selecting the external directory service from the list of external directory services; and
   obtaining the connection information from the selected external directory service.

3. The method as recited in claim 1, wherein the mapping comprises:
   identifying an organization unit within the external authorities as a group search path;
   obtaining subgroups within the group search path;
   associating a role from the roles with one or more mapped groups of the subgroups; and
   storing the association of the role and the one or more mapped groups, the one or more mapped groups and one or more users within each of the one or more mapped groups.

4. The method as recited in claim 1, wherein the external directory service includes a LDAP server and a LDAP repository.

5. The method of claim 1, further comprising:
   obtaining the internal authorities from the plurality of resource databases; and
   based on the mapping of the internal authorities and the external authorities, exporting the internal authorities to the external directory service.

6. The method of claim 1, further comprising:
   synchronizing the internal authorities and the external authorities.

7. The method of claim 1, wherein obtaining the users and the groups from the external authorities including:
   reading the external authorities as a data stream from stdin or a socket connection; and
   decoding the data stream to obtain the users and the groups.

8. A backup storage system comprising:
   an external directory server to configure external authorities, wherein the external authorities include users and groups for authentication and access control;
   an external repository connected to the directory server to store the external authorities;
   a plurality of resource databases storing internal authorities comprising configurations, roles and member users assigned to each of the roles to provide authentication and access control to the backup storage system; and
   a directory service engine, that resides on a backup server within the backup storage system, with a processor configured to
      retrieve the external authorities from the external directory service,
      process the external authorities to obtain users and groups,
      map the users and the groups to the internal authorities, and
      distribute and store the mapping to the plurality of resource databases.

9. The system as recited in claim 8, wherein the directory service engine with the processor is configured to export internal authorities from the resource databases to the external directory service.

10. The system as recited in claim 8, wherein the directory service engine with the processor is configured to
   receive a request for authentication,
   determine whether the server uses the external directory service for authentication,
   upon a determination that the server is configured to use the external directory service for authentication, send authentication data to the external directory service, upon a determination that the server is configured to use the internal authorities for authentication and access control, send the authentication data to the internal authorities, and receive a confirmation and access control data.

11. A computer program product providing authorities used in authentication and access control for a backup system comprising a non-transitory computer usable medium having machine readable code embodied therein for:

receiving a connection information associated with an external directory service, wherein the connection information includes an authority name and a provider server name associated with the external directory service;

connecting to the external directory service using the connection information;

upon a successful connection, obtaining external authorities from the external directory service, wherein the external authorities comprises users and groups stored in the external directory service;

obtaining the users and the groups from the external authorities;

mapping the users and the groups to internal authorities, wherein the internal authorities include configurations, roles, and member users assigned to each of the roles, the internal authorities stored in a plurality of resource databases provides authentication and access control to the backup system; and distributing and storing the mapping to the plurality of resource databases.

\* \* \* \* \*